(12) United States Patent
Turturro et al.

(10) Patent No.: US 9,603,764 B2
(45) Date of Patent: Mar. 28, 2017

(54) METHOD AND APPARATUS FOR A LOCKING CASTER

(71) Applicant: Medline Industries, Inc., Mundelein, IL (US)

(72) Inventors: Michael Turturro, Chicago, IL (US); Matthew Kruse, Arlington Heights, IL (US)

(73) Assignee: Medline Industries, Inc., Northfield, IL (US)

( * ) Notice: Subject to any disclaimer, the term of this patent is extended or adjusted under 35 U.S.C. 154(b) by 250 days.

(21) Appl. No.: 14/177,417

(22) Filed: Feb. 11, 2014

(65) Prior Publication Data

US 2015/0224823 A1    Aug. 13, 2015

(51) Int. Cl.
*B60B 33/02* (2006.01)
*A61G 7/05* (2006.01)
*B60B 33/00* (2006.01)

(52) U.S. Cl.
CPC ............. *A61G 7/05* (2013.01); *A61G 7/0528* (2016.11); *B60B 33/0021* (2013.01); *B60B 33/025* (2013.01); *B60B 33/02* (2013.01); *B60B 33/026* (2013.01); *B60B 2200/242* (2013.01); *B60B 2900/3312* (2013.01); *B60B 2900/531* (2013.01); *Y10T 16/195* (2015.01); *Y10T 16/196* (2015.01)

(58) Field of Classification Search
CPC ..... B60B 33/02; B60B 33/025; B60B 33/026; B60B 33/028; B60B 33/0021; A61G 2007/0528; Y10T 16/195; Y10T 16/196
See application file for complete search history.

(56) References Cited

U.S. PATENT DOCUMENTS

| | | | |
|---|---|---|---|
| 146,997 A | 2/1874 | Eddy |
| 721,610 A | 2/1903 | Scott |
| 772,596 A | 10/1904 | Williams |
| 1,085,444 A | 1/1914 | Lawrence |
| 1,110,838 A | 9/1914 | Taylor |
| 1,265,257 A | 5/1918 | Schellinger |
| 1,430,675 A | 10/1922 | Svante |
| 1,483,607 A | 2/1924 | Horst |
| 1,487,171 A | 3/1924 | La Vigne |
| 1,500,858 A | 7/1924 | Woods |
| 1,639,801 A | 8/1927 | Heise |
| 1,694,172 A | 12/1928 | Gallowitz |
| 1,738,548 A | 12/1929 | White |
| 1,804,639 A | 5/1931 | Noelting |
| 1,924,496 A | 8/1933 | Herod |
| 1,958,494 A | 5/1934 | Pehrsson |
| 2,081,594 A | 5/1937 | McIntosh |
| 2,110,227 A | 3/1938 | Koenigkramer |

(Continued)

FOREIGN PATENT DOCUMENTS

| | | | |
|---|---|---|---|
| EP | 0625434 | * | 11/1994 |
| FR | 2783463 | * | 3/2000 |
| FR | 2927843 | * | 8/2009 |

*Primary Examiner* — Jeffrey O Brien
(74) *Attorney, Agent, or Firm* — Fitch, Even, Tabin & Flannery LLP

(57) ABSTRACT

A lockable swivelable caster provides for an interaction between a centering element and a locking element to pivotally urge the locking element into a locking notch of the centering element such that the locking element is captured by the locking notch to prevent swiveling of the caster wheel.

12 Claims, 6 Drawing Sheets

(56) References Cited

U.S. PATENT DOCUMENTS

| | | | |
|---|---|---|---|
| 2,127,309 A | 8/1938 | Rickard | |
| 2,244,122 A | 6/1941 | Scudder | |
| 2,360,453 A | 10/1944 | Sullivan | |
| 2,450,971 A | 10/1948 | Letch | |
| 2,512,160 A | 6/1950 | Koenigkramer | |
| 2,564,333 A | 8/1951 | Kelly | |
| 2,583,858 A * | 1/1952 | Kostolecki | B60B 33/02 16/35 D |
| 2,596,250 A | 5/1952 | Klingler | |
| 2,599,383 A | 6/1952 | Graham | |
| 2,599,717 A | 6/1952 | Menzies | |
| 2,613,372 A | 10/1952 | Waterman | |
| 2,666,217 A | 1/1954 | Stuart | |
| 2,728,936 A | 1/1956 | Hodges | |
| 2,747,919 A | 5/1956 | Ferneau | |
| 2,749,996 A | 6/1956 | Parker | |
| 2,763,520 A | 9/1956 | Climo | |
| 2,781,525 A | 2/1957 | Bauer | |
| 2,798,232 A | 7/1957 | Ericsson | |
| 2,818,315 A | 12/1957 | Limbach | |
| 2,830,304 A | 4/1958 | Ericsson | |
| 2,831,201 A | 4/1958 | Limbach | |
| 2,833,587 A | 5/1958 | Saunders | |
| 2,834,030 A | 5/1958 | Jones | |
| 2,841,438 A | 7/1958 | Weil | |
| 2,869,614 A | 1/1959 | Wamsley | |
| 2,877,047 A | 3/1959 | Weil | |
| 2,877,048 A | 3/1959 | Weil | |
| 2,889,561 A | 6/1959 | Martin | |
| 2,905,952 A | 9/1959 | Adolphson | |
| 2,915,775 A | 12/1959 | Skupas | |
| 2,945,242 A | 7/1960 | Heiden | |
| 2,958,873 A | 11/1960 | Ferneau | |
| 2,984,843 A | 5/1961 | Johnson | |
| 3,023,825 A | 3/1962 | Rabjohn | |
| 3,026,542 A | 3/1962 | Tabbert | |
| 3,049,725 A | 8/1962 | Bovre | |
| 3,057,655 A | 10/1962 | Weil | |
| 3,070,828 A | 1/1963 | Clinton | |
| 3,088,770 A | 5/1963 | Weil | |
| 3,104,112 A | 9/1963 | Crail | |
| 3,135,346 A | 6/1964 | Bertozzi | |
| 3,159,865 A | 12/1964 | Shepherd | |
| 3,243,825 A | 4/1966 | Tabbert | |
| 3,252,169 A | 5/1966 | Propst | |
| 3,253,284 A | 5/1966 | St John | |
| 3,289,219 A | 12/1966 | Ferneau | |
| 3,304,116 A | 2/1967 | Stryker | |
| 3,341,246 A | 9/1967 | Lavallee | |
| 3,380,085 A | 4/1968 | Ferneau | |
| 3,386,111 A | 6/1968 | Peggy | |
| 3,393,004 A | 7/1968 | Williams | |
| 3,409,105 A | 11/1968 | Clinton | |
| 3,452,371 A | 7/1969 | Hirsch | |
| 3,483,574 A | 12/1969 | Belnap | |
| 3,521,722 A | 7/1970 | Dimonte | |
| 3,571,842 A | 3/1971 | Fricke | |
| 3,636,586 A | 1/1972 | Bollinger | |
| 3,644,944 A | 2/1972 | Bourgraf | |
| 3,705,438 A | 12/1972 | Engels | |
| 3,751,758 A * | 8/1973 | Higbee | B60B 33/02 16/35 R |
| 3,759,565 A | 9/1973 | Ferneau | |
| 3,772,733 A | 11/1973 | Engels | |
| 3,815,164 A | 6/1974 | Smith | |
| 3,820,190 A | 6/1974 | Moller | |
| 3,820,838 A | 6/1974 | Limpach | |
| 3,826,528 A | 7/1974 | East | |
| 3,854,152 A | 12/1974 | Chez | |
| 3,879,772 A | 4/1975 | Pol | |
| 3,879,796 A | 4/1975 | Whyte | |
| 3,890,668 A | 6/1975 | Siegfried | |
| 3,890,669 A | 6/1975 | Reinhards | |
| 3,911,525 A | 10/1975 | Haussels | |
| 3,918,554 A | 11/1975 | Bourgraf | |
| 3,924,292 A | 12/1975 | Christensen | |
| 3,967,328 A | 7/1976 | Cox | |
| 3,980,334 A | 9/1976 | Ferneau | |
| 3,988,800 A | 11/1976 | Sachser | |
| 4,000,530 A | 1/1977 | Green | |
| 4,011,609 A | 3/1977 | Bethlen | |
| 4,023,849 A | 5/1977 | Bethlen | |
| 4,035,864 A | 7/1977 | Schroder | |
| 4,037,291 A | 7/1977 | Huempfner | |
| 4,052,097 A | 10/1977 | Weil | |
| 4,164,355 A | 8/1979 | Eaton | |
| 4,175,783 A | 11/1979 | Pioth | |
| 4,190,280 A | 2/1980 | Donohoe | |
| 4,205,413 A | 6/1980 | Collignon | |
| 4,235,454 A | 11/1980 | Gray | |
| 4,236,261 A | 12/1980 | Huempfner | |
| 4,246,677 A | 1/1981 | Downing | |
| 4,248,444 A | 2/1981 | Johnson | |
| 4,254,928 A | 3/1981 | Huempfner | |
| 4,259,756 A | 4/1981 | Pace | |
| 4,261,589 A | 4/1981 | Wilkes | |
| 4,276,962 A | 7/1981 | Aulik | |
| 4,280,246 A | 7/1981 | Christensen | |
| 4,300,782 A | 11/1981 | Pioth | |
| 4,325,561 A | 4/1982 | Lynn | |
| 4,349,937 A | 9/1982 | Fontana | |
| 4,385,414 A | 5/1983 | Damico | |
| 4,405,172 A | 9/1983 | Ferneau | |
| 4,414,702 A | 11/1983 | Neumann | |
| 4,439,879 A | 4/1984 | Werner | |
| 4,453,732 A | 6/1984 | Assanah | |
| 4,485,504 A | 12/1984 | Lehmann | |
| 4,489,449 A | 12/1984 | Failor | |
| 4,494,272 A | 1/1985 | Morita | |
| 4,501,414 A | 2/1985 | Mason | |
| 4,503,844 A | 3/1985 | Siczek | |
| 4,513,832 A | 4/1985 | Engman | |
| 4,534,075 A | 8/1985 | Schnitzler | |
| 4,575,896 A * | 3/1986 | Nakao | B60B 33/0042 16/343 |
| 4,576,096 A | 3/1986 | Toder | |
| 4,579,381 A | 4/1986 | Williams | |
| 4,584,989 A | 4/1986 | Stith | |
| 4,592,104 A | 6/1986 | Foster | |
| 4,629,242 A | 12/1986 | Schrager | |
| 4,631,761 A | 12/1986 | Lederman | |
| 4,684,148 A * | 8/1987 | Glaser | B60B 33/0042 16/35 R |
| 4,688,279 A | 8/1987 | Vance | |
| 4,718,077 A | 1/1988 | Moore | |
| 4,720,893 A | 1/1988 | Mellwig | |
| 4,722,114 A | 2/1988 | Neumann | |
| 4,723,808 A | 2/1988 | Hines | |
| 4,731,899 A * | 3/1988 | Huang | B60B 33/02 16/344 |
| 4,772,015 A | 9/1988 | Carlson | |
| 4,847,945 A * | 7/1989 | Schwartz | B60B 33/0078 16/30 |
| 4,875,696 A | 10/1989 | Welch | |
| 4,922,574 A | 5/1990 | Heiligenthal | |
| 4,957,121 A | 9/1990 | Icenogle | |
| 4,976,447 A | 12/1990 | Batson | |
| 4,985,960 A | 1/1991 | Zun | |
| 4,987,623 A | 1/1991 | Stryker | |
| 4,998,320 A | 3/1991 | Lange | |
| 5,005,230 A | 4/1991 | Congdon | |
| 5,014,391 A | 5/1991 | Schulte | |
| 5,015,024 A | 5/1991 | Bloemer | |
| 5,023,967 A | 6/1991 | Ferrand | |
| 5,040,265 A | 8/1991 | France | |
| 5,048,133 A | 9/1991 | Iura | |
| 5,084,922 A | 2/1992 | Louit | |
| 5,111,541 A | 5/1992 | Wagner | |
| 5,115,539 A | 5/1992 | Lee | |
| 5,117,521 A | 6/1992 | Foster | |
| 5,135,063 A | 8/1992 | Kropf | |
| 5,140,720 A | 8/1992 | Sisler | |
| 5,163,189 A | 11/1992 | DeGray | |
| 5,165,141 A | 11/1992 | Soltani | |

(56) References Cited

U.S. PATENT DOCUMENTS

| | | | |
|---|---|---|---|
| 5,172,781 A | 12/1992 | Hlavinka | |
| 5,184,373 A | 2/1993 | Lange | |
| 5,205,381 A | 4/1993 | Mehmen | |
| 5,242,179 A | 9/1993 | Beddome | |
| 5,244,062 A | 9/1993 | Felton | |
| 5,263,226 A | 11/1993 | Roy | |
| 5,271,113 A | 12/1993 | White | |
| 5,283,919 A | 2/1994 | Grant | |
| 5,296,261 A | 3/1994 | Bouet | |
| 5,299,659 A | 4/1994 | Imbeault | |
| 5,303,450 A | 4/1994 | Lange | |
| 5,319,817 A | 6/1994 | Hay | |
| 5,337,845 A | 8/1994 | Foster | |
| 5,343,988 A * | 9/1994 | Bartsch | A45C 5/145 |
| | | | 16/35 R |
| 5,347,682 A | 9/1994 | Edgerton | |
| 5,348,326 A | 9/1994 | Fullenkamp | |
| 5,351,364 A * | 10/1994 | Zun | B60B 33/025 |
| | | | 16/35 R |
| 5,365,622 A | 11/1994 | Schirmer | |
| 5,371,921 A | 12/1994 | Roe | |
| 5,377,372 A | 1/1995 | Rudolf | |
| 5,388,294 A | 2/1995 | Reeder | |
| 5,402,543 A | 4/1995 | Dietrich | |
| 5,421,548 A | 6/1995 | Bennett | |
| 5,432,966 A | 7/1995 | Berta | |
| 5,435,027 A | 7/1995 | Bourgraf | |
| 5,450,639 A | 9/1995 | Weismiller | |
| 5,457,831 A | 10/1995 | Foster | |
| 5,477,570 A | 12/1995 | Hannant | |
| 5,503,416 A | 4/1996 | Aoki | |
| 5,509,159 A | 4/1996 | Du-Bois | |
| 5,517,718 A | 5/1996 | Eichhorn | |
| 5,519,916 A | 5/1996 | Mainard | |
| 5,522,100 A | 6/1996 | Schilling | |
| 5,535,465 A | 7/1996 | Hannant | |
| 5,537,700 A | 7/1996 | Way | |
| 5,570,988 A | 11/1996 | Gallaway | |
| 5,572,756 A | 11/1996 | Muuranen | |
| 5,580,207 A | 12/1996 | Kiebooms | |
| 5,625,913 A | 5/1997 | Singleton | |
| 5,669,090 A | 9/1997 | Basgall | |
| 5,669,100 A * | 9/1997 | Carpenter | B60B 33/021 |
| | | | 16/35 R |
| 5,692,254 A | 12/1997 | Boettcher | |
| 5,799,366 A | 9/1998 | Zocco | |
| 5,802,639 A | 9/1998 | Raasch | |
| 5,899,469 A | 5/1999 | Pinto | |
| 5,913,559 A | 6/1999 | Sexton | |
| 5,933,889 A | 8/1999 | Eekhoff | |
| 5,937,959 A | 8/1999 | Fujii | |
| 5,967,535 A | 10/1999 | King | |
| 5,983,614 A * | 11/1999 | Hancock | A01D 75/28 |
| | | | 16/35 R |
| 5,996,149 A | 12/1999 | Heimbrock | |
| 6,000,486 A | 12/1999 | Romick | |
| 6,009,575 A | 1/2000 | Hsieh | |
| 6,062,577 A | 5/2000 | Tan | |
| 6,094,846 A * | 8/2000 | Feller | B60B 33/0002 |
| | | | 16/35 D |
| 6,098,732 A | 8/2000 | Romick | |
| 6,125,485 A | 10/2000 | Way | |
| 6,178,575 B1 | 1/2001 | Harada | |
| 6,203,085 B1 | 3/2001 | Ferris | |
| 6,205,601 B1 | 3/2001 | Nessmann | |
| 6,212,733 B1 * | 4/2001 | Yeh | B60B 33/0002 |
| | | | 16/35 R |
| 6,219,864 B1 | 4/2001 | Ellis | |
| 6,230,343 B1 | 5/2001 | Buiskool | |
| 6,253,397 B1 | 7/2001 | Bartow | |
| 6,256,812 B1 | 7/2001 | Bartow | |
| 6,266,831 B1 | 7/2001 | Heimbrock | |
| 6,276,010 B1 | 8/2001 | Way | |
| 6,286,183 B1 | 9/2001 | Stickel | |
| 6,286,184 B1 | 9/2001 | Dean | |
| 6,296,261 B1 * | 10/2001 | deGoma | A61G 7/05 |
| | | | 188/1.12 |
| 6,298,950 B1 | 10/2001 | Oelrichs | |
| 6,314,597 B2 | 11/2001 | Heimbrock | |
| 6,321,878 B1 | 11/2001 | Mobley | |
| 6,343,665 B1 | 2/2002 | Eberlein | |
| 6,353,948 B1 | 3/2002 | Bolden | |
| 6,374,438 B1 | 4/2002 | Fox | |
| 6,390,213 B1 | 5/2002 | Bleicher | |
| 6,398,409 B1 | 6/2002 | Brooks | |
| 6,401,278 B1 | 6/2002 | Hayes | |
| 6,427,263 B1 | 8/2002 | Lindell | |
| 6,460,205 B1 | 10/2002 | Lewandowski | |
| 6,474,434 B1 | 11/2002 | Bech | |
| 6,505,359 B2 | 1/2003 | Heimbrock | |
| 6,505,365 B1 | 1/2003 | Hanson | |
| 6,507,964 B1 | 1/2003 | Lewandowski | |
| 6,526,609 B2 | 3/2003 | Wong | |
| 6,526,611 B2 | 3/2003 | Flynn | |
| 6,539,566 B1 | 4/2003 | Hayes | |
| 6,546,577 B1 | 4/2003 | Chinn | |
| 6,574,813 B2 | 6/2003 | Bolden | |
| 6,575,052 B2 | 6/2003 | Toennesland | |
| 6,584,629 B2 | 7/2003 | Tsuji | |
| 6,588,523 B2 | 7/2003 | Heimbrock | |
| 6,592,132 B2 | 7/2003 | Bidwell | |
| 6,598,247 B1 | 7/2003 | Turner | |
| 6,611,975 B1 | 9/2003 | Ricketts | |
| 6,615,430 B2 | 9/2003 | Heimbrock | |
| 6,619,438 B1 | 9/2003 | Yang | |
| 6,640,361 B2 | 11/2003 | Heimbrock | |
| 6,643,873 B2 | 11/2003 | Heimbrock | |
| 6,651,280 B2 | 11/2003 | Blevins | |
| 6,654,973 B2 | 12/2003 | Van Den Heuvel | |
| 6,662,404 B1 | 12/2003 | Stroh | |
| 6,681,424 B1 | 1/2004 | Bourgraf | |
| 6,684,424 B2 | 2/2004 | Jehn | |
| 6,701,545 B1 | 3/2004 | Ferneau | |
| 6,718,571 B2 | 4/2004 | Bartels | |
| 6,725,956 B1 | 4/2004 | Lemire | |
| 6,728,984 B2 | 5/2004 | Dietrich | |
| 6,729,421 B1 | 5/2004 | Gluck | |
| 6,735,794 B1 | 5/2004 | Way | |
| 6,749,034 B2 | 6/2004 | Vogel | |
| 6,752,224 B2 | 6/2004 | Hopper | |
| 6,766,547 B1 | 7/2004 | Lagassey | |
| 6,792,630 B1 | 9/2004 | Palmatier | |
| 6,810,560 B1 | 11/2004 | Tsai | |
| 6,820,293 B2 | 11/2004 | Alverson | |
| 6,820,294 B2 | 11/2004 | Shiery | |
| 6,824,152 B1 | 11/2004 | Scott | |
| 6,843,349 B2 | 1/2005 | Walsh | |
| 6,845,533 B1 | 1/2005 | Tulette | |
| 6,854,137 B2 | 2/2005 | Johnson | |
| 6,854,567 B2 | 2/2005 | Suzuki | |
| 6,865,775 B2 | 3/2005 | Ganance | |
| 6,871,714 B2 | 3/2005 | Johnson | |
| 6,874,800 B2 | 4/2005 | George | |
| 6,880,202 B2 * | 4/2005 | Thompson | A47C 19/024 |
| | | | 16/35 R |
| 6,899,345 B1 * | 5/2005 | Bearden | A01D 34/74 |
| | | | 16/19 |
| 6,908,087 B2 * | 6/2005 | Wintersgill | B60B 33/0002 |
| | | | 16/35 R |
| 6,916,056 B2 | 7/2005 | Mitchell | |
| 6,920,656 B2 | 7/2005 | Roussy | |
| 6,942,226 B2 | 9/2005 | Walkingshaw | |
| 6,976,696 B2 | 12/2005 | O'Krangley | |
| 6,978,501 B2 | 12/2005 | Vrzalik | |
| 6,993,799 B2 | 2/2006 | Foster | |
| 7,003,829 B2 | 2/2006 | Choi | |
| 7,003,830 B2 | 2/2006 | Ito | |
| 7,007,765 B2 | 3/2006 | Waters | |
| 7,017,228 B2 | 3/2006 | Silverstein | |
| 7,018,157 B2 | 3/2006 | Gallant | |
| 7,021,407 B2 | 4/2006 | Ruschke | |
| 7,021,641 B2 | 4/2006 | Wu | |
| 7,062,805 B2 | 6/2006 | Hopper | |

(56) References Cited

U.S. PATENT DOCUMENTS

| | | |
|---|---|---|
| 7,090,042 B2 | 8/2006 | Coveyou |
| 7,100,224 B2 | 9/2006 | Knipfel |
| 7,124,456 B2 | 10/2006 | Palmatier |
| 7,131,151 B2 | 11/2006 | Ferneau |
| 7,131,769 B2 | 11/2006 | Vezina |
| 7,134,155 B2 | 11/2006 | Freeborn |
| 7,140,055 B2 | 11/2006 | Bishop |
| 7,162,757 B2 | 1/2007 | Edgerton |
| 7,171,708 B2 | 2/2007 | Osborne |
| 7,191,854 B2 | 3/2007 | Lenkman |
| 7,200,894 B2 | 4/2007 | Block |
| 7,302,717 B2 | 12/2007 | Reinke |
| 7,302,722 B2 | 12/2007 | Karmer |
| 7,305,727 B2 | 12/2007 | Horlin |
| 7,311,161 B2 | 12/2007 | Lee |
| 7,316,298 B2 | 1/2008 | Yeager |
| 7,334,276 B2 | 2/2008 | Pfeuffer |
| 7,334,277 B2 | 2/2008 | Johnson |
| 7,383,611 B2 | 6/2008 | Foster |
| 7,406,731 B2 | 8/2008 | Hornbach |
| 7,409,734 B2 | 8/2008 | Benedict |
| 7,412,734 B2 | 8/2008 | Stryker |
| 7,419,019 B1 | 9/2008 | White |
| 7,424,758 B2 | 9/2008 | Broadley |
| 7,472,437 B2 | 1/2009 | Riley |
| 7,472,439 B2 | 1/2009 | Lemire |
| 7,478,855 B2 | 1/2009 | Lambarth |
| 7,484,252 B2 | 2/2009 | Wang |
| 7,506,404 B2 | 3/2009 | Wang |
| 7,521,891 B2 | 4/2009 | Choy |
| 7,543,583 B2 | 6/2009 | Acton |
| 7,559,098 B2 | 7/2009 | He |
| 7,568,247 B2 | 8/2009 | Strobel |
| 7,581,265 B1 | 9/2009 | Bourgraf |
| 7,603,729 B2 | 10/2009 | Patterson |
| 7,612,301 B2 | 11/2009 | Arnold |
| 7,614,115 B2 | 11/2009 | Yan |
| 7,617,549 B2 | 11/2009 | Pollock |
| 7,621,003 B2 | 11/2009 | Myers |
| D605,876 S | 12/2009 | Linder |
| 7,627,915 B2 | 12/2009 | Eriksson |
| 7,631,379 B2 | 12/2009 | Lindner |
| 7,637,464 B2 | 12/2009 | Heimbrock et al. |
| 7,637,550 B2 | 12/2009 | Menna |
| 7,641,623 B2 | 1/2010 | Biondo |
| 7,644,458 B2 | 1/2010 | Foster et al. |
| 7,669,258 B2 | 3/2010 | Koch |
| 7,676,861 B2 | 3/2010 | Ward |
| 7,676,862 B2 | 3/2010 | Poulos |
| 7,676,868 B2 | 3/2010 | Reckelhoff |
| 7,685,660 B2 | 3/2010 | Hallock |
| 7,690,057 B2 | 4/2010 | Malassigne |
| 7,694,368 B2 | 4/2010 | Lewis |
| 7,712,166 B2 | 5/2010 | Stryker |
| 7,766,289 B2 | 8/2010 | Newkirk |
| 7,775,574 B2 | 8/2010 | Matunaga |
| 7,784,125 B2 | 8/2010 | Morin |
| 7,788,748 B2 | 9/2010 | Wurdeman |
| 7,789,187 B2 | 9/2010 | Zerhusen |
| 7,805,782 B2 | 10/2010 | Hakamiun |
| 7,805,784 B2 | 10/2010 | Lemire |
| 7,805,786 B2 | 10/2010 | Lambarth |
| 7,810,183 B2 | 10/2010 | Kawaguchi |
| 7,810,613 B2 | 10/2010 | Lin |
| 7,827,634 B2 | 11/2010 | Stroth |
| 7,836,531 B2 | 11/2010 | Girard |
| 7,856,685 B2 | 12/2010 | Matunaga |
| 7,861,370 B2 | 1/2011 | Chu |
| 7,865,983 B2 | 1/2011 | Newkirk |
| 7,882,580 B2 | 2/2011 | Hensley |
| 7,882,582 B2 | 2/2011 | Kappeler |
| 7,886,380 B2 | 2/2011 | Hornbach |
| 7,896,118 B2 | 3/2011 | Williamson |
| 7,913,335 B2 | 3/2011 | Carr |
| 7,913,336 B2 | 3/2011 | Morin |
| 7,917,978 B2 | 4/2011 | Ruschke |
| 7,922,183 B2 | 4/2011 | Figel |
| 7,926,131 B2 | 4/2011 | Menkedick |
| 7,926,145 B2 | 4/2011 | Liao |
| 7,950,080 B2 | 5/2011 | Brossart |
| 7,954,828 B2 | 6/2011 | Falk |
| 7,979,931 B2 | 7/2011 | Wurdeman |
| 7,992,254 B2 | 8/2011 | Ahn |
| 8,001,631 B2 | 8/2011 | Giesser |
| 8,011,035 B2 | 9/2011 | Pizzi Spadoni |
| 8,011,039 B2 | 9/2011 | Stryker |
| 8,020,225 B2 | 9/2011 | Vrzalik |
| 8,024,101 B2 | 9/2011 | Frolik |
| 8,051,511 B2 | 11/2011 | Nahavandi |
| 8,051,513 B2 | 11/2011 | Reed |
| 8,051,533 B2 | 11/2011 | Block |
| 8,056,160 B2 | 11/2011 | Poulos |
| 8,056,163 B2 | 11/2011 | Lemire |
| 8,069,514 B2 | 12/2011 | Poulos |
| 8,079,606 B2 | 12/2011 | Dull |
| 8,091,162 B2 | 1/2012 | Wurdeman |
| 8,096,005 B2 | 1/2012 | Carletti |
| 8,104,121 B2 | 1/2012 | Bourgraf |
| 8,109,525 B2 | 2/2012 | Salus |
| 8,122,535 B2 * | 2/2012 | Hensley ............... G06K 7/0008 16/35 R |
| 8,136,185 B2 | 3/2012 | Olszewski |
| 8,151,388 B2 | 4/2012 | West |
| 8,155,918 B2 | 4/2012 | Reed |
| 8,156,586 B2 | 4/2012 | Reed |
| 8,176,584 B2 | 5/2012 | Hornbach |
| 8,191,940 B2 | 6/2012 | Bly |
| 8,196,237 B2 | 6/2012 | Herbst |
| 8,205,297 B2 | 6/2012 | Fallshaw |
| RE43,532 E | 7/2012 | Menkedick |
| 8,214,970 B2 | 7/2012 | Sullivan |
| 8,258,944 B2 | 9/2012 | Riley |
| 8,266,741 B2 | 9/2012 | Penninger |
| 8,266,742 B2 | 9/2012 | Andrienko |
| 8,341,777 B2 * | 1/2013 | Hensley ............... G06K 7/0008 16/18 R |
| 8,424,158 B2 | 4/2013 | Steenson |
| 8,452,508 B2 | 5/2013 | Frolik |
| 2002/0125055 A1 | 9/2002 | Broek |
| 2002/0189015 A1 | 12/2002 | Barssessat |
| 2004/0111798 A1 | 6/2004 | Matunaga |
| 2006/0010643 A1 | 1/2006 | Hornbach |
| 2006/0059656 A1 | 3/2006 | Hackett |
| 2006/0101581 A1 | 5/2006 | Blanchard |
| 2006/0191073 A1 | 8/2006 | Honda |
| 2006/0213009 A1 | 9/2006 | Stevens |
| 2006/0225203 A1 | 10/2006 | Hosoya |
| 2007/0000057 A1 | 1/2007 | Ward |
| 2007/0044272 A1 | 3/2007 | Misin |
| 2007/0089238 A1 | 4/2007 | Kramer |
| 2007/0113344 A1 | 5/2007 | Hurwitz |
| 2007/0169269 A1 | 7/2007 | Wells |
| 2007/0170673 A1 | 7/2007 | Figel |
| 2007/0245488 A1 | 10/2007 | Zimbalista |
| 2008/0005842 A1 | 1/2008 | Schrand |
| 2008/0098525 A1 | 5/2008 | Doleschal |
| 2008/0116656 A1 | 5/2008 | Araya |
| 2008/0178429 A1 | 7/2008 | Haselsteiner |
| 2008/0209634 A1 | 9/2008 | Stevens |
| 2008/0238072 A1 | 10/2008 | Kofoed |
| 2008/0264733 A1 | 10/2008 | Hayes |
| 2008/0276370 A1 | 11/2008 | Van Es |
| 2009/0001740 A1 | 1/2009 | Kofoed |
| 2009/0019670 A1 | 1/2009 | Tsai |
| 2009/0051184 A1 | 2/2009 | Saleem |
| 2009/0155033 A1 | 6/2009 | Olsen |
| 2009/0307844 A1 | 12/2009 | Hornbach |
| 2010/0083442 A1 | 4/2010 | Nash |
| 2010/0107360 A1 | 5/2010 | Shih |
| 2010/0122415 A1 | 5/2010 | Turner |
| 2010/0132159 A1 | 6/2010 | Armano |
| 2010/0138997 A1 | 6/2010 | Hoppner |
| 2010/0180380 A1 | 7/2010 | Van Scheppingen et al. |
| 2010/0181122 A1 | 7/2010 | Block |

(56) References Cited

U.S. PATENT DOCUMENTS

| | | |
|---|---|---|
| 2010/0187379 A1 | 7/2010 | Kragh |
| 2010/0223727 A1 | 9/2010 | Newkirk |
| 2011/0010857 A1 | 1/2011 | Falbo |
| 2011/0018296 A1 | 1/2011 | Broadley |
| 2011/0023268 A1 | 2/2011 | Smith |
| 2011/0030142 A1 | 2/2011 | Karwal |
| 2011/0061952 A1 | 3/2011 | Altena |
| 2011/0078857 A1 | 4/2011 | Kubiak |
| 2011/0080016 A1 | 4/2011 | Lambarth |
| 2011/0083270 A1 | 4/2011 | Bhai |
| 2011/0083271 A1 | 4/2011 | Bhai |
| 2011/0083272 A1 | 4/2011 | Childs |
| 2011/0087416 A1 | 4/2011 | Patmore |
| 2011/0113556 A1 | 5/2011 | Roussy |
| 2011/0175304 A1 | 7/2011 | Arbogast |
| 2011/0203051 A1 | 8/2011 | Snell |
| 2011/0214235 A1 | 9/2011 | Schreuder et al. |
| 2011/0222667 A1 | 9/2011 | Gregerson |
| 2011/0232027 A1 | 9/2011 | Block |
| 2011/0232028 A1 | 9/2011 | Lee |
| 2011/0258774 A1 | 10/2011 | Zeng |
| 2011/0260483 A1 | 10/2011 | Chinn |
| 2011/0266821 A1 | 11/2011 | Goto |
| 2011/0272200 A1 | 11/2011 | Clapp |
| 2011/0277241 A1 | 11/2011 | Schejbal |
| 2011/0291372 A1 | 12/2011 | Stryker |
| 2012/0000718 A1 | 1/2012 | Berrett |
| 2012/0007323 A1 | 1/2012 | Janick |
| 2012/0054983 A1 | 3/2012 | Steenson |
| 2012/0080899 A1 | 4/2012 | Green |
| 2012/0084914 A1 | 4/2012 | Patterson |
| 2012/0117731 A1 | 5/2012 | Turner |
| 2012/0137435 A1 | 6/2012 | Hornbach |
| 2012/0159705 A1 | 6/2012 | Tsukada |
| 2012/0174319 A1 | 7/2012 | Menkedick |
| 2012/0198620 A1 | 8/2012 | Hornbach |
| 2012/0199423 A1 | 8/2012 | Heidlage |
| 2012/0211956 A1 | 8/2012 | Chen |
| 2012/0311821 A1 | 12/2012 | Eguchi |
| 2013/0160237 A1 | 6/2013 | Shih |

\* cited by examiner

METHOD AND APPARATUS FOR A LOCKING CASTER

TECHNICAL FIELD

These teachings relate generally to lockable casters.

BACKGROUND

Casters, in their basic form, are generally understood in the art to include one or more wheels swivelably or pivotably mounted to an object so that the object can move across a surface in any direction. Often, casters are capable of being locked in one or more orientations so that the movement of the wheels, and thus the object coupled thereto, is generally limited to a direction corresponding to that orientation.

Various available locking swivelable casters employ a locking mechanism that requires the caster to be set in the orientation in which it is to be locked prior to or at the time of locking. For example, certain casters will not allow a locking mechanism to be activated unless the caster is in the orientation in which it will be locked. It can be time consuming and frustrating for a user to properly orient the caster prior to engaging the locking mechanism.

Additionally, hospital beds including stretchers (or other hospital equipment) often utilize swivel casters to accommodate movement of the hospital bed in multiple directions. However, when such a hospital bed is being moved in a straight line, such as down a straight hall, pivotable casters can often cause the bed to drift or move in directions other than the intended direction, making straight line movement difficult to control or achieve. As the hospital bed is pushed faster (as may occur in emergency situations), the difficulties in maintaining a straight line may become more apparent. Further, turning corners can be difficult as the casters do not provide a lateral force to the direction of travel which can be used to convert momentum in one direction to momentum in another direction. In essence, the individual or individuals pushing and/or pulling the hospital bed must often bring the bed to at least a near stop, reorient the bed in the proper direction, and then resume movement.

Current solutions exist to aid in straight-line travel such as placing one or more non-swivelable or non-pivotable wheels at or near the center of the hospital bed that selectively engage and disengage the surface of the floor. When engaging the floor, these non-swivelable wheels act as a keel of sorts to provide lateral resistance during movement of the hospital bed to aid in straight-line movement and while turning corners. These current solutions, however, require mechanisms to move the wheel to selectively engage and disengage the surface. Additionally, at the moment the wheel is activated to engage the surface, the movement of the hospital bed is immediately limited as described above. Thus, engagement must occur exactly when restricted movement is desired. Though suitable for at least some purposes, such an approach does not necessarily meet all needs of all application settings and/or all users.

BRIEF DESCRIPTION OF THE DRAWINGS

The above needs are at least partially met through provision of the swivelable caster described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a swivelable caster is provided including a centering element, a locking element, and a biasing element. When engaged, the interaction of these elements allows the caster to be pivotally urged to a certain orientation and then locked at that orientation until disengaged. So configured, a swivel locking mechanism of the swivelable caster can be engaged while the wheel is oriented in a position other than the orientation in which it is to be locked. Such engagement will then cause or help to cause the caster to orient to the position wherein the swivel lock takes effect. Thus, the operation of engaging the swivel lock and the actual locking can occur at different times and while the caster is in different orientations. Such approaches allow for the caster to be utilized in other settings and in other ways than previously used.

Figure 1:
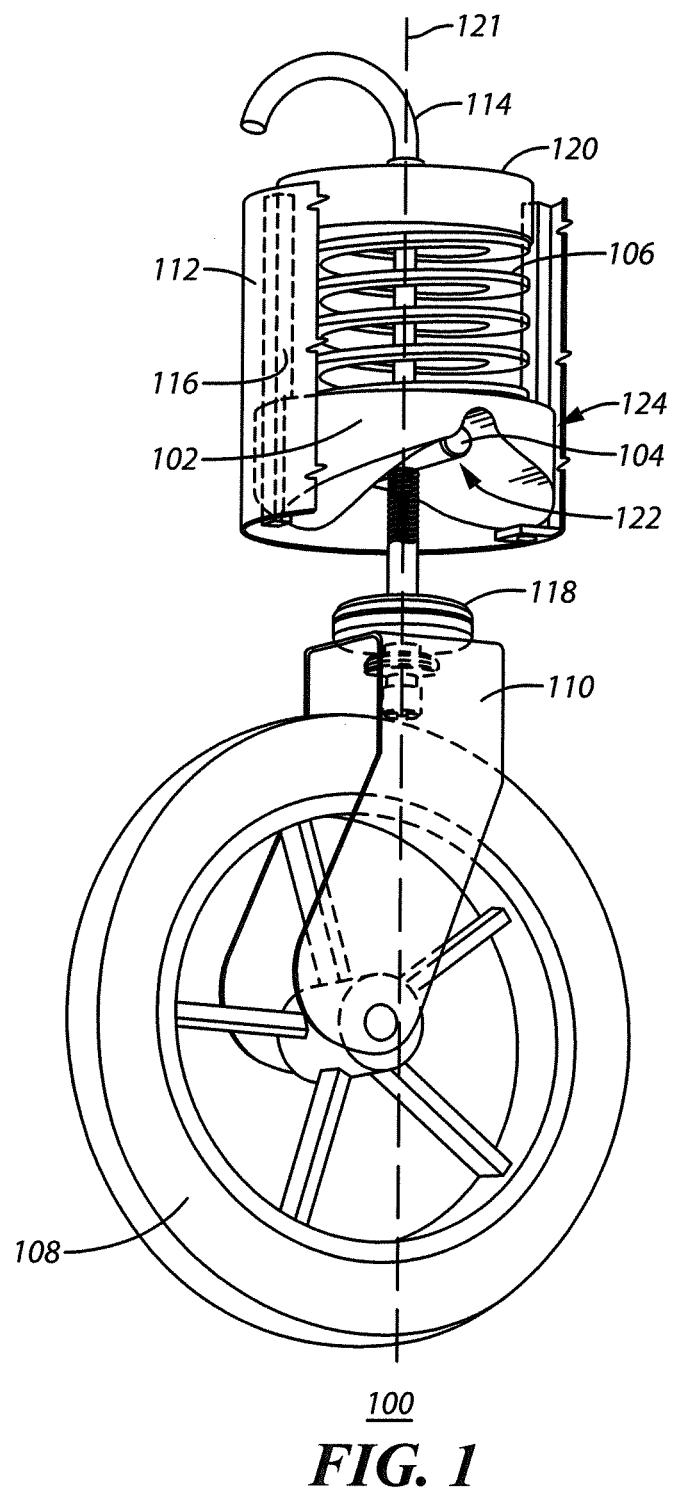
FIG. 1 comprises a swivelable caster as configured in accordance with various embodiments of these teachings.

These and other benefits may become clearer upon making a thorough review and study of the following detailed description. Referring now to the drawings, and in particular to FIG. 1, an illustrative caster that is compatible with many of these teachings will now be presented.

The caster 100 includes a centering element 102, a locking element 104, and a biasing element 106. By some approaches, the caster 100 also includes at least one wheel 108, a wheel support 110, a housing 112 enclosing at least a portion of the centering element 102 and the locking element 104, a disengagement device 114, one or more anti-rotation rails 116, a thrust bearing 118, and a stop plate 120.

By one example approach, and as is illustrated in FIG. 1, the wheel 108 is rotatably coupled to the wheel support 110 to allow the wheel 108 to rotate about its rotational axis. The wheel support 110 is configured to pivot or swivel about a pivot axis 121 that is different than the rotational axis of the wheel 108, as is typical with casters. For example, the pivot axis 121 may be substantially vertical, while the rotational axis of the wheel may be substantially horizontal. As is also typical with casters, the rotational axis of the wheel 108 is offset from the pivot axis 121 (for example, by 0.5 to 1 inches). By this, the wheel 108 and wheel support 110 properly orient themselves so that the wheel's rotational axis follows behind the pivot axis 121 in the direction in which the caster is moving. The thrust bearing 118 is typically the primary weight interface between the caster 100 and the object to which it couples. For example, a frame of the object (e.g., a hospital bed or other medical equipment) may rest directly on top of the thrust bearing 118, thus transferring the majority of the weight therethrough to the caster 100 while allowing the wheel support 110 to freely pivot about the pivot axis 121.

The wheel support 110 is coupled to either the centering element 102 or the locking element 104. Whichever is coupled to the wheel support 110 is a pivoting element 122 that pivots about the pivot axis 121 in tandem with the wheel support 110. The approach shown in FIG. 1 illustrates the locking element 104 as the pivoting element 122; however, by other approaches the centering element 102 may instead be the pivoting element 122 and thus be coupled to the wheel support 110. The other of the centering element 102 or the locking element 104, being the element not coupled to the wheel support 110 (the centering element 102 in the example of FIG. 1), is pivotally stationary about the pivot axis 121 and hence comprises a pivotally stationary element 124. By one approach, the pivotally stationary element 124 may slide or move along the pivot axis 121 along the anti-rotation rails 116 that are disposed on the interior of the housing 112 in parallel to the pivot axis 121, but the element 124 is otherwise prevented from rotating about the pivot axis 121 by the anti-rotation rails 116. For example, the pivotally stationary element 124 may have one or more notches therein corresponding to the anti-rotation rails 116 to allow it to slide along the pivot axis 121 but not rotate thereabout.

The pivotally stationary element 124 (the centering element 102 in the example of FIG. 1) is biased along the pivot axis 121 toward the pivoting element 122 (the locking element 104 in the example of FIG. 1) by a biasing force from the biasing element 106. For example, the biasing element 106 may comprise a compression spring, such as a hi-rate flat spring, that is compressed between a top side of the pivotally stationary element 124 and a stop plate 120. By other approaches, the biasing element 106 may comprise a bag or canister that can be selectively pressurized or depressurized with air or a gas. In such approaches, the biasing element 106 exerts a biasing force onto the pivotally stationary element 124 in a direction parallel to the pivot axis 121 and toward the pivoting element 122.

Figure 4:
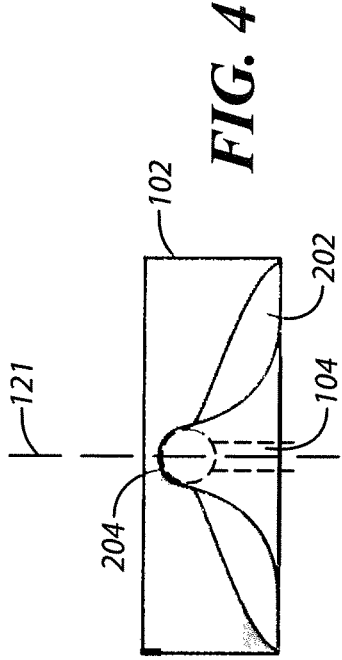
FIG. 4 is an elevational view of the centering element of FIG. 2, as configured in accordance with various embodiments of these teachings.
Figure 3:
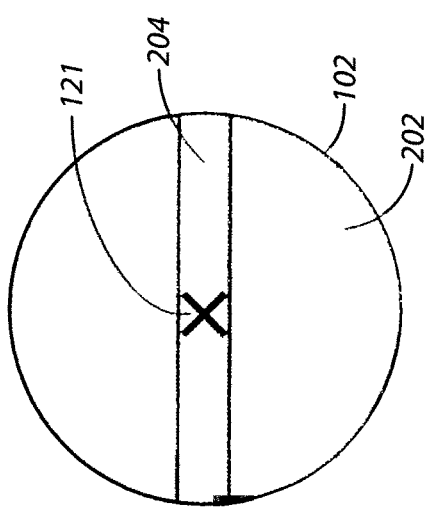
FIG. 3 is an end view of the centering element of FIG. 2, as configured in accordance with various embodiments of these teachings.
Figure 2:
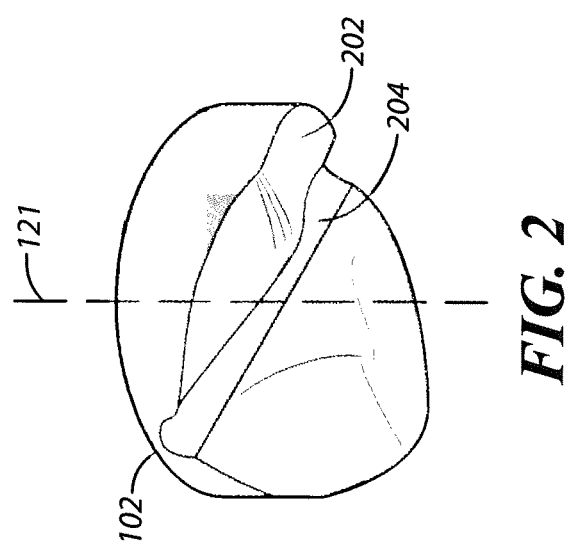
FIG. 2 is a perspective view of a centering element of the swivelable caster of FIG. 1 as configured in accordance with various embodiments of these teachings.

Turning now to FIGS. 2-4, further detailed description of the centering element 102 is provided. FIG. 2 is a perspective view, FIG. 3 is an end view, and FIG. 4 is a side elevational view (and illustrates the locking element 104 captured by the centering element 102, as is discussed in further detail below). By one approach, the centering element 102 is an end cam with an end camming surface 202.

The end camming surface 202 may be, at least in part, a circular surface that is concentric with the pivot axis 121. It may be a solid circular surface, as is shown in the figures, or it may be a circular (or non-circular) ring that may be concentric with the pivot axis. However, an advantage is realized with the use of a solid circular surface that is contoured to provide an end camming surface 202 as it allows for maximized contact with an end cam follower (such as the locking element 102 shaped in a "T" shape as shown in FIG. 1) to reduce sliding friction and reduce wear on the interacting elements 102, 104. Further, although shown as occupying the entirety of one side of the centering element 102 (shown as a contoured disc), the end camming surface 202 may occupy only a portion of a side of the centering element 102. For example, the centering element 102 as a whole may be a square shape, but the end camming surface 202 may only occupy a solid circular portion, a ring, or other portion of a side of the centering element 102. The end camming surface 202, or the centering element 102 as a whole, may be constructed of polished stainless steel or other durable material so as to reduce friction and wear during interaction with the locking element 102. By some approaches, portions or all of the camming surface 202 may be coated with additional materials to further help reduce friction.

The end camming surface 202 may be radially symmetrical about the pivot axis 121. By this, the height of the camming profile 500 (see FIG. 5) will be the same on both sides of the pivot axis 121 for any line that is both perpendicular to and intersects the pivot axis 121. In other words, the height of the end camming profile 500 of the camming surface at any radial angle about the pivot axis 121 will be equal to the height of the profile 500 at a 180° offset. For example, the height of the camming profile at 90° will be the same as the height at 270°, 0° will be the same as 180°, 45° will be the same as 225°, and so forth.

Figure 5:
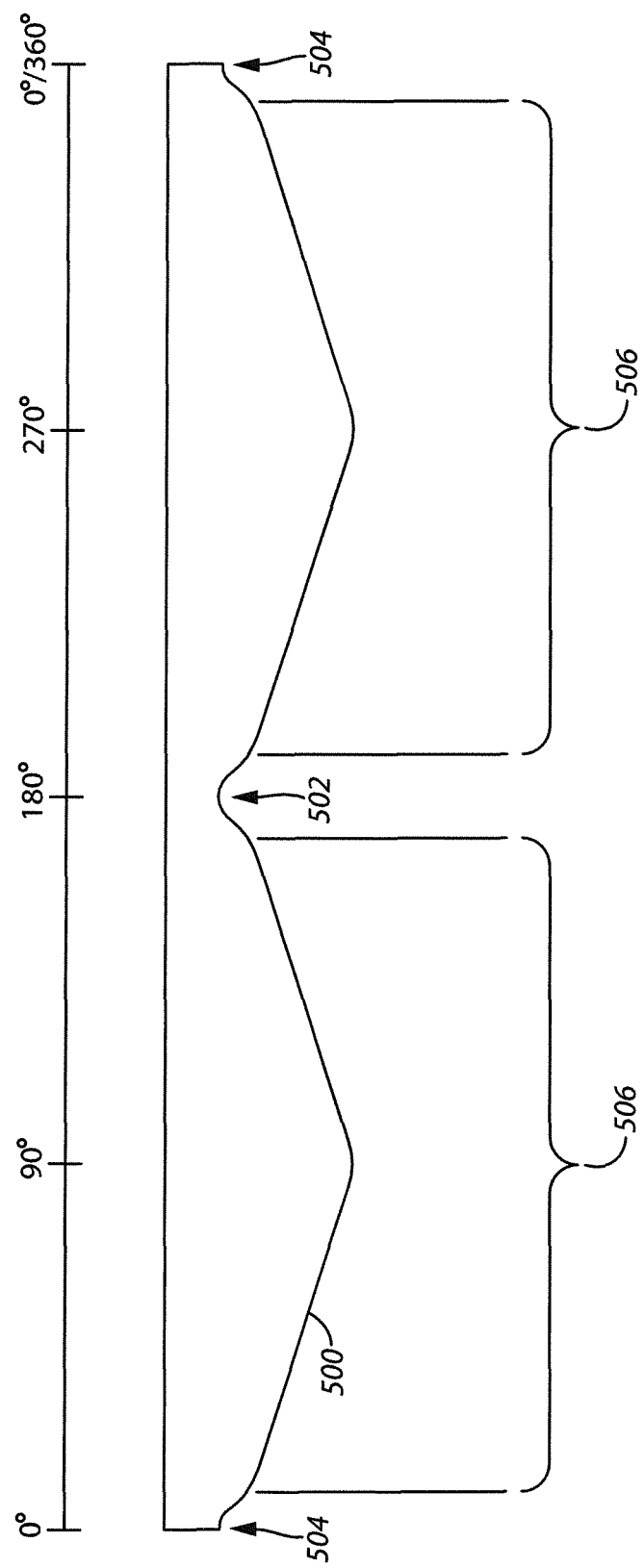
FIG. 5 comprises a radial view of an end camming profile of an end camming surface of the centering element of FIG. 2, as configured in accordance with various embodiments of these teachings.

This is perhaps best illustrated in FIG. 5, which shows an example end camming profile 500 of an end camming surface 202 radially about the pivot axis 121 from 0° to 360°. More precisely, this illustrates the rotational camming behavior of a corresponding end cam follower (being the locking element 104 in this approach). As can be seen here, the height of the camming profile 500 of the end camming surface 202 at 0° is the same as at 180°, 90° is the same as 270°, and so forth, thus making the end camming profile 500 of the end camming surface 202 radially symmetrical about the pivot axis. One should note that the three-dimensional shape of the end camming surface 202 may vary significantly while still achieving a radial end camming profile 500 as depicted in FIG. 5 or as otherwise desired. The important factor in the relationship between the shape of the end camming surface 202 and its corresponding end camming profile 500 is how it affects the offset along the pivot axis 121 of the corresponding end cam follower (i.e., locking element 104) as one rotates relative to the other about the pivot axis 121.

With continuing reference to FIG. 5, the camming profile 500 of the end camming surface 202 includes at least a first locking notch 502, and by some approaches, a second locking notch 504. The first 502 and second locking notches 504 may be approximately 180° apart about the pivot axis 121. As is shown in the approach of FIGS. 2-4, the two locking notches 502, 504 may comprise two longitudinal sides of a locking channel 204 that bisects the end camming surface 202 through the pivot axis 121. However, by other approaches, the locking notches 502, 504 may be distinct and separated notches that are not connected across the end camming surface 202. For example, the locking element 104 is depicted in FIG. 1 as a member (for example, a straight bar) that extends away from and generally perpendicular to the pivot axis 121, and in such an approach, a locking channel 204 would beneficially allow the locking element 104 to enter into the first and/or second notches 502, 504. However, if the locking element 104 has other shapes, such as a "V" or "U" shape where center portions of the locking element 104 do not contact the end camming surface 202 of the centering element 102, then locking notches 502, 504 that are not connected across the end camming surface 202 may be utilized. Further, in an approach that utilizes an end camming surface being a circular ring concentric with the pivot axis 121 instead of a solid circular surface, the locking notches 502, 504 will inherently be separated.

As discussed above, the locking element 104 may include at least one member that extends away from and perpendicular to the pivot axis 121. It may extend from only one side, (like an "L" shape) or both sides 180° apart (like a "T" shape as depicted in FIG. 1). At least a portion of this member is configured to contact the end camming surface 202 of the centering element 102. When captured by the locking notch 502, 504, a majority of the length of the member may contact the end camming surface 202 along and in the locking channel 204. Many other configurations and shapes are possible for the locking element 104, including shapes that have multiple vertical support elements (such as a "TT" shape). As discussed above, a shape that allows for maximum contact with the camming surface 202 (such as the "T" shape of FIG. 1) will help reduce wear and any resulting increase in friction therefrom. The contacting portions of the locking element 104, and possibly the entirety of the element 104, are constructed from polished stainless steel or other hardened metal or material to ensure proper strength and durability. The contacting portions of the locking element 104 may optionally be coated with a material that may decrease friction as well.

Figure 6:
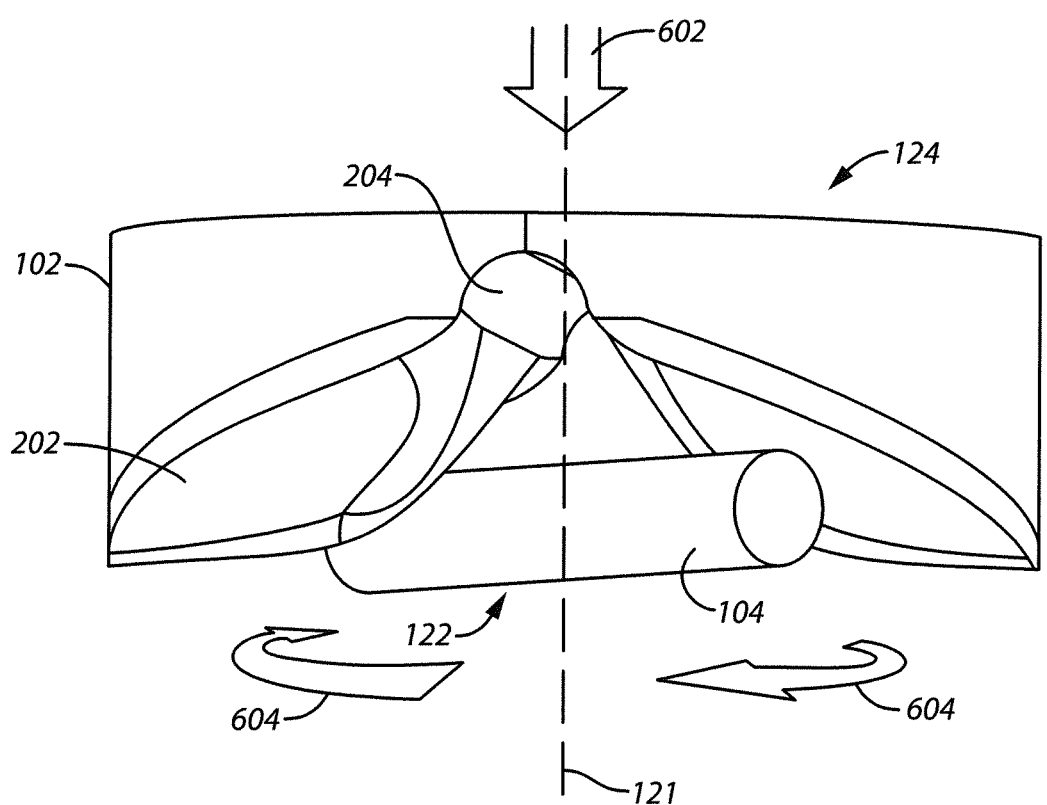
FIG. 6 is a perspective view of the centering element of FIG. 2 interacting with a locking element as configured in accordance with various embodiments of these teachings.
Figure 7:
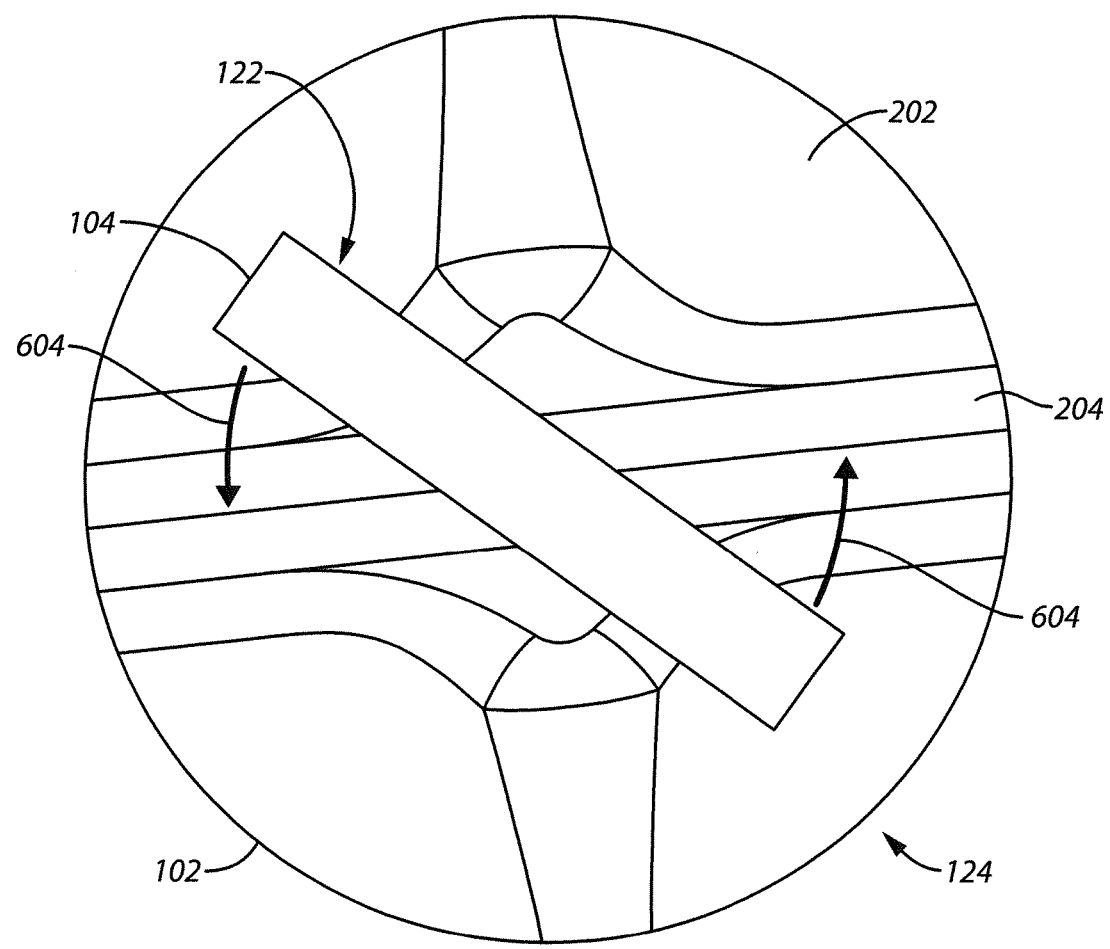
FIG. 7 is an end view showing the same interaction as FIG. 6, in accordance with various embodiments of the invention.

Turning now to FIGS. 6 and 7, the interaction between the centering element 102 and the locking element 104 is depicted. As previously described, the locking element 104 acts as an end cam follower by interacting with the end cam surface 202 of the centering element 102. As the locking element 104 rotates relative to the centering element 102 about the pivot axis 121, the relative height along the pivot axis 121 of the centering element 102 relative to the locking element 104 will vary (according to the end camming profile 500). Through this interaction, the biasing force 602 (from the biasing element 106) exerted axially along the pivot axis 121 onto the pivotally stationary element 124 (being the centering element 102 in the illustrated approach) is transformed to a pivoting bias 604 about the pivot axis 121. This pivotally urges the pivoting element 122 (being the locking element 104 in the illustrated approach) toward an orientation where it rests within the locking channel 204 (comprising locking notches 502, 504). Although the illustrated approach shows the pivotally stationary element 124 as the centering element 102 and the pivoting element 122 as the locking element 104, if their roles are reversed, then the biasing force 602 would be exerted onto the locking element 104 and the centering element 102 would responsively pivot about the pivot axis 121. Either approach is acceptable and within the scope of the current disclosure.

When the locking element 104 rests within the locking channel 204 (or locking notches 502, 504), the locking element 104 is pivotally captured therein such that the locking element 104 is restricted from pivoting relative to the centering element 102 about the pivot axis 121. Such capturing is illustrated in FIG. 4. In one example, notches 502, 504 or channel 204 capture the locking element 104 only while the biasing force 602 is at least partially applied, or until such time as the biasing force 602 is operatively removed (i.e., the force is mostly or entirely removed from the pivotally stationary element 124) or countered (i.e., another force is introduced to the biasing element 106 or the pivotally stationary element 124 in the opposite direction to counter the biasing force 602) by the disengagement device 114. By one approach, the biasing force 602 is countered by the disengagement device 114 moving the pivotally stationary element 102 along the pivot axis 121 away from the pivoting element 104 to release the locking element 104 from the locking notch 502, 504 to allow the pivoting element 122 to pivot once again. This may entail sliding the pivotally stationary element 124 enough so that the centering element 102 does not contact the locking element 104. By one approach, such sliding may be achieved with a disengagement device 114 that includes a Bowden cable (such as is commonly used with bicycles). One end of the Bowden cable may be attached to a side of the pivotally stationary element 124 (the centering element 102 in the example) with the other end being coupled to a lever (such as a pedal or hand brake) or other means to pull the Bowden cable. As the Bowden cable is pulled, the pivotally stationary element 124 slides away from the locking element 104.

When the locking element 104 is captured within the locking notch 502, 504, the pivoting element 122 is restricted from pivoting. Because the pivoting element 122 is pivotally coupled to the wheel support 110 and thus the wheel 108, they are also restricted from pivoting about the pivot axis 121. By this, the wheel 108, and thus the lockable swivelable caster 100, is locked into a first orientation about the pivot axis 121 so that it can no longer swivel (i.e., a locked wheel orientation). In some approaches, the pivoting element 122, the wheel support 110, and the wheel 108 can be locked into a second orientation that is 180° from the first orientation about the pivot axis 121. For example, if such a caster 100 were coupled to a hospital bed, it could be locked into orientations corresponding to moving the bed forward (toward the foot end) or backward (toward the head end). Other and additional orientations are possible. For example, though less likely, four orientations could exist, each being approximately 90° apart (e.g., 0°, 90°, 180°, and) 270° corresponding to forward, backward, and lateral movement.

Returning now to FIG. 5, the end camming profile 500 of the end camming surface 202 includes the first and second locking notches 502, 504. The majority of the remainder of the camming profile 500 is a biasing camming surface 506 that pivotally urges the locking element toward the notches 502, 504, and thus to a preset orientation corresponding to those notches. It is these biasing camming surfaces 506 that transform the biasing force 602 along the pivot axis 121 to the pivoting bias force 604. Accordingly, the pivoting element 122 is pivotally biased toward a locked orientation where the locking element 104 is captured by one or more locking notch 502, 504 whenever the pivoting element 122 is in substantially any orientation other than the locked orientation. The biasing camming surface portions 506 of the end camming profile 500 may be triangular with substantially straight edges and rounded peaks (as shown). In other approaches, they may include concave or convex curves as desired. The peaks may be centered between the locking notches 502, 504 (i.e., at 90° and 270°), or may be shifted to the left or right, which will thus favor pivoting in one direction over another.

A method of orienting a caster 100 may include allowing the centering element 102 or the locking element 104 to pivot about the pivot axis 121 to comprise a pivoting element 122 while maintaining the other in a pivotally stationary position to comprise a pivotally stationary element 124. A biasing force 602 may be applied to bias the pivotally stationary element 124 along the pivot axis 121 toward the pivoting element 122. The method further includes transforming the bias 602 to a pivoting bias 604 about the pivot axis 121 to pivotally bias the pivoting element 122 toward at least one orientation, the transforming occurring through interaction between an end cam follower of the locking element 104 and an end camming surface on the centering element 102. The locking element 104 is then captured by at least one locking notch 502, 504 in the end camming surface 202 when the pivoting element 122 is in the at least one orientation to restrict pivoting thereof while the biasing force 602 is at least partially applied.

So configured, a caster 100 and method of using the same is provided that allows for engagement of a swivel locking mechanism that will orient the wheel 108 into a predetermined orientation, but is engageable from any orientation the wheel 108 may presently be in. Further, the engagement of the swivel locking mechanism will actively pivotally bias the wheel 108 to the predetermined orientation when it is not in the predetermined orientation. These aspects eliminate the need to set the caster 100 in the orientation in which it is to be locked prior to or at the time of locking, thus reducing the time and precision required for a user to orient the caster wheel 108 prior to engaging the locking means.

Figure 8:
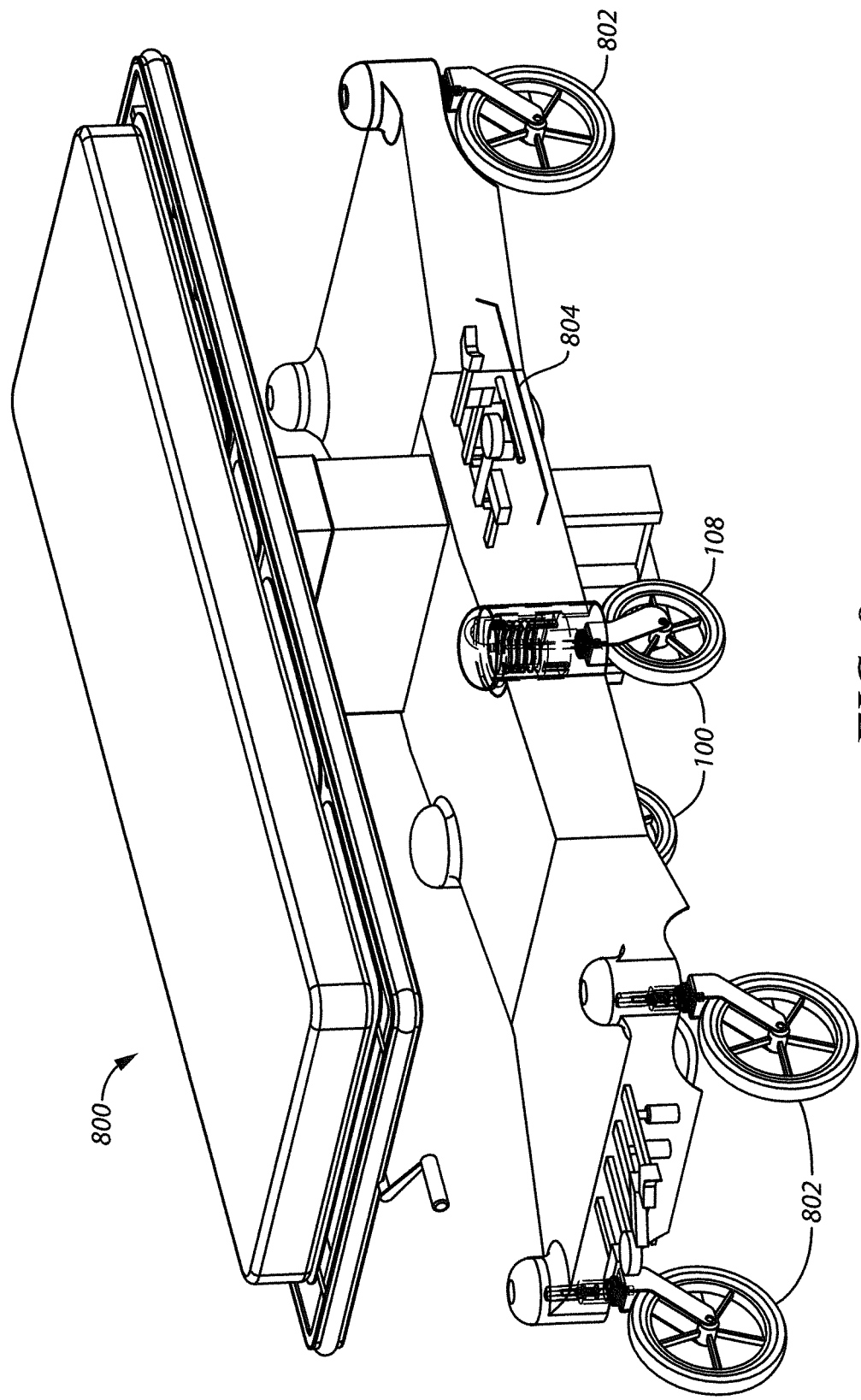
FIG. 8 comprises a hospital bed as configured in accordance with various embodiments of these teachings.

Turning now to FIG. 8, an illustrative use of the caster 100 of FIG. 1 is shown. A hospital bed 800 typically includes four swivelable casters 802 located at or toward the corners of the bed 800. When the hospital bed 800 is being moved, these corner casters 802 can make it difficult to move the bed 800 in a straight line, for example, down a straight hall. One or more additional lockable swivelable casters 100, as described herein, can be added somewhere near the center of the hospital bed 800 to aid in straight-line transportation of a patient. The lockable swivelable casters 100 are situated such that their wheels 108 contact a flat surface upon which the hospital bed 800 resides whether locked or free to swivel, thus aiding in the weight distribution of the bed 800 and a patient laying thereupon. The caster 100 is configured such that it can be locked into an orientation corresponding to a longitudinal wheel orientation, wherein the wheel 108 is oriented parallel to the longitudinal axis of the bed 800 (i.e., running from head end to foot end). A method of orienting the caster 100 may include moving the hospital bed 800 on the surface generally along the longitudinal axis, wherein such movement pivotally biases the wheel 108 of the caster 100 toward the longitudinal wheel orientation, which in turn further biases the pivoting element 122 toward an orientation where the locking element 104 is captured by the notch 502, 504. Once captured, the caster 100 maintains the longitudinal wheel orientation, which in turn prevents lateral movement of the hospital bed 800 during straight-line movement and while turning and simultaneously moving forward.

Once it is no longer desired to limit the hospital bed 800 to straight-line movement, the lockable swivelable casters 100 may be unlocked to allow pivoting action once again. To do so, the disengagement device 114 may be actuated, perhaps by the use of one or more pedals 804, to move the pivotally stationary element 124 of the caster 100 away from the pivoting element 122 to release the locking element 104 from the locking notch 502, 504. This in turn allows the caster 100 to pivot to allow for lateral movement of the hospital bed 800.

So configured, a hospital bed 800 or other equipment utilizing a lockable swivelable caster 100 as described herein to selectively aid in straight-line travel allows for the caster 100 to remain in contact with the floor surface to aid in weight distribution as opposed to previous solutions that raise and lower center wheels. Further, engagement of the swivel locking mechanism of the caster 100 does not need to occur exactly at the point when restricted movement is desired. For example, the locking mechanism can be engaged while the bed 800 is still moving laterally, but the caster 100 may not lock until movement in the longitudinal direction begins. Further, the caster 100 does not need to be precisely oriented in the longitudinal wheel orientation as the pivoting bias force 604 will bias the wheel into the locked position.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An apparatus comprising:
   a caster comprising:
      a centering element comprising an end cam, the end cam further comprising an end camming surface having a camming profile including at least one locking notch;
      a locking element comprising an end cam follower configured to contact the end camming surface of the centering element;
      a biasing element;
      wherein one of the centering element and the locking element is configured to pivot about a pivot axis and hence comprise a pivoting element, and wherein the other of the locking element and the centering element is configured to remain pivotally stationary about the pivot axis and hence comprise a pivotally stationary element, the pivotally stationary element being further configured to be biased along the pivot axis toward the pivoting element by a biasing force from the biasing element;
      wherein the biasing element, through interaction between the end camming surface and the locking element, pivotally urges the locking element relative to the centering element toward at least a first orientation wherein the at least one locking notch of the end camming surface captures the locking element such that the pivoting element is restricted from pivoting about the pivot axis until the biasing force from the biasing element is at least one of operatively removed or countered;
      a disengagement device configured to axially slide the centering element away from the locking element along the pivot axis such that the centering element does not contact the locking element.

2. The apparatus of claim 1 further comprising: wherein the disengagement device is configured to at least one of operatively remove or counter the biasing force on the pivotally stationary element to disengage the locking element from the at least one locking notch of the end camming surface to allow the pivoting element to pivot about the pivot axis.

3. The apparatus of claim 1 wherein the caster further comprises: a wheel support coupled to the pivoting element, the wheel support and the pivoting element configured to pivot about the pivot axis in tandem; wherein the wheel support is restricted from pivoting about the pivot axis when the at least one locking notch captures the locking element.

4. The apparatus of claim 1 wherein the at least one locking notch comprises at least a first locking notch and a second locking notch, the first and second locking notches configured to capture the locking element in at least a first orientation and a second orientation, wherein the first and second orientations are oriented 180° from each other about the pivot axis.

5. The apparatus of claim 1 wherein a substantial majority of the portion of the end camming surface camming profile other than the at least one locking notch comprises a biasing camming surface configured to pivotally urge the locking element toward the first orientation.

6. The apparatus of claim 1 wherein the end cam follower of the locking element comprises, at least in part, at least one member extending away from and perpendicular to the pivot axis, at least a portion of the at least one member configured to contact the end camming surface of the centering element.

7. The apparatus of claim 1 further comprising a housing enclosing at least a portion of the centering element and the locking element, the housing including at least one anti-rotation rail disposed on the interior of the housing parallel to the pivot axis and configured to keep the pivotally stationary element pivotally stationary and to allow the pivotally stationary element to slide along the at least one anti-rotation rail along the pivot axis.

8. The apparatus of claim 1 wherein the biasing element comprises at least one spring oriented to provide the biasing force parallel to the pivot axis.

9. The apparatus of claim 1 wherein the end camming surface comprises, at least in part, a circular surface that is concentric with the pivot axis, and wherein the camming profile of the end camming surface is radially symmetrical about the pivot axis.

10. A caster comprising:
    at least one wheel;
    a wheel support rotatably coupled to the at least one wheel to allow the at least one wheel to rotate about a rotational axis of the at least one wheel, the wheel support configured to pivot about a pivot axis that is different than the rotational axis of the at least one wheel;
    a locking element coupled to the wheel support and configured to pivot about the pivot axis in tandem with the wheel support, the locking element comprising an end cam follower;
    a biasing element;
    a centering element configured to remain pivotally stationary about the pivot axis and to be axially biased along the pivot axis toward the locking element by a biasing force from the biasing element, the centering element comprising an end camming surface configured to contact the end cam follower of the locking element, wherein the end camming surface comprises a camming profile comprising at least two locking notches approximately 180° from each other about the pivot axis and configured to pivotally capture the locking element such that the locking element, the wheel support, and the at least one wheel are restricted form pivoting about the pivot axis while the biasing force from the biasing element is applied, and wherein at least a portion of the remainder of the camming profile is configured to bias the locking element toward at least one of locking notches;
    a disengagement device configured to axially slide the centering element away from the locking element along the pivot axis such that the centering element does not contact the locking element.

11. The caster of claim 10 wherein the end cam follower of the locking element comprises, at least in part, at least one member extending away from and perpendicular to the pivot axis and configured to contact the end camming surface of the centering element along the majority of the length of the at least one member when captured by at least one of the at least two locking notches.

12. The caster of claim 10 wherein the two locking notches further comprise two longitudinal sides of a locking channel bisecting the end camming surface through the pivot axis.

* * * * *